T. MOORE.
Apparatus for Purifying Kaolin, &c.

No. 50,077. Patented Sept. 19, 1865.

UNITED STATES PATENT OFFICE.

THOMAS MOORE, OF CORNWALL, CONNECTICUT, ASSIGNOR TO JOHN ELLERBY, OF NEW YORK, N. Y.

IMPROVED APPARATUS FOR PURIFYING KAOLIN, &c.

Specification forming part of Letters Patent No. 50,077, dated September 19, 1865.

*To all whom it may concern:*

Be it known that I, THOMAS MOORE, of Cornwall, in the county of Litchfield and State of Connecticut, have invented new and useful Improvements in Mineral-Dressing Machines; and I do hereby declare that the following is a full, clear, and exact description thereof, which will enable others skilled in the art to make and use the same, reference being had to the accompanying drawings, forming part of this specification.

The present invention relates more particularly to machines adapted for the dressing of kaolin clay, extensively used both in the manufacture of porcelain-ware and paper, from gritty substances; and it consists in submitting the clay to the action of a current or currents of water within a machine so constructed and arranged as to accomplish the desired object with economy and dispatch and in a most satisfactory manner, as will be hereinafter explained, reference being had to the accompanying plate of drawings, of which—

Figure 1:
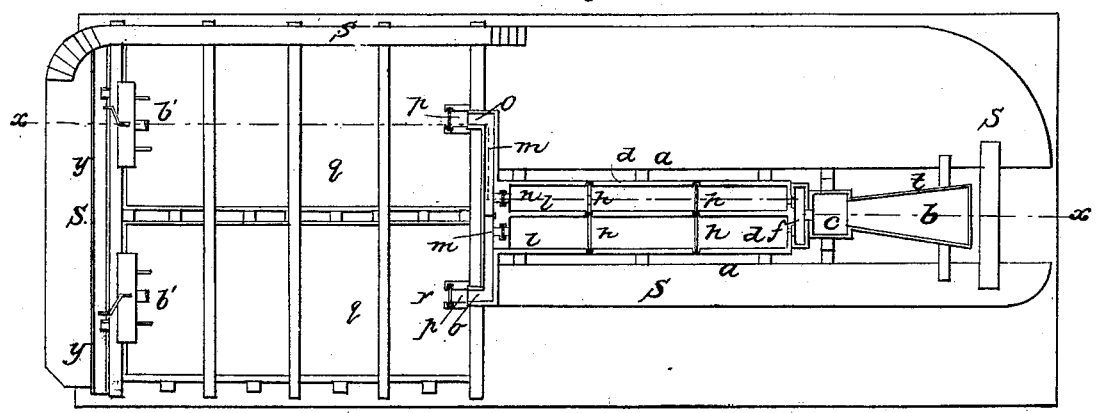
Figure 2:
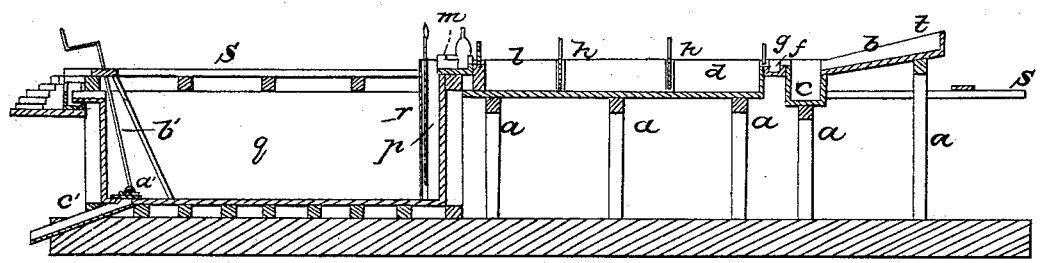

Figure 1 is a plan or top view of the machine or apparatus; and Fig. 2, a longitudinal vertical section taken in the plane of the line $x\,x$, Fig. 1.

$a\,a$ in the drawings represent frame-work suitable for supporting the strake $b$, slightly inclined toward and communicating with the basin or receptacle $c$, interposed between which and two parallel drags, $d\,d$, placed in a horizontal position, is a launder, $f$, having two flood-gates, $g\,g$, one for each drag $d$, by the removal of which communication is allowed between the launder and either one or both of the drags, according as is desired.

In the drags, and at intermediate points between the two ends, are flood-gates $h\,h$, arranged in any proper manner so as to be raised or lowered at pleasure, the farther end $l$ of each of the drags communicating with a launder, $m$, through flood-gates $n\,n$. This launder at each end $o$ communicates with the receivers or tanks $q\,q$ through a vertical spout or tube, $p$, extending to, or nearly so, the bottom of the same, said spouts having a slide, $r$, by raising or lowering which their outlet to the receivers can be increased or decreased in size at pleasure, as will be presently described.

$s\,s$ represent a platform or walk for passing around and about the machine.

When the apparatus is to be used a current of water—say from a fall of thirty (30) inches—is connected with the outer end of the strake $b$, while at the same time the clay to be dressed is shoveled or in any other proper manner placed in and upon the same at or near the point $t$ and agitated or stirred under the fall of water, which clay then, by the force of such current, is carried from the strake over and into the basin $c$, where, depositing a great proportion of its large and heavy particles, it is conveyed therefrom by the current into the launder $f$, from whence, by opening its flood-gates $g\,g$, or only one, as may be desired, it is still further carried by the water current into the first section of the drag or drags, from which, as it or they become full, it passes to the next or middle section, and so on to the third, by raising or opening at the proper times their respective flood-gates, and from thence into the launder through its flood-gates, and down through the tubes or spout of the receivers into the same, when the water finally passes off from the machine or apparatus into the waste spout or gutter $y$. During the passage of the clay as it is carried along by the current of water, commencing at the strake $b$, to the launder, it continually deposits in each of the many vessels or receptacles through which it passes a certain proportion of its gritty substances, or those of a heavier specific gravity than the pure clay, gradually decreasing in amount, however, as it approaches the receivers, where nothing but the pure clay, free from all gritty substances of whatsoever nature, is deposited, the flood-gates of the drag or drags, according as one or both of the drags are used, being adjusted to such a height as to regulate the strength and force of the water current or currents passing through them to such a degree as to only allow of the passage of the clay to the receiver, and to cause all its gritty substances to be deposited in the drags, the greater the height to which such gates are raised or opened correspondingly increasing the fineness to which the separation or dressing of the clay is carried. Without the gates, however, not only would the sand and other gritty substances settle in the drags, but the greater portion of the clay with it, and therefore, in the regulation of the height to which the flood-gates should be opened, care must be taken that, while the current is kept at such a force as to allow the heavy or gritty particles to settle in the drag or drags, the greater proportion of the clay will be carried over and into the receivers through the intermediate launder.

By passing the clay into the receivers or tanks through the conducting spouts or tubes $p$, as described, which open into them at or near the bottom, the settlings of the clay is greatly facilitated, as it is thus brought directly to the bottom of the tank, in lieu of being delivered upon the surface of the water therein, as has heretofore been the case, through the whole depth of which it was obliged to fall before reaching the bottom, the disadvantage and impracticability of which method, especially in the settling of light minerals, are so evident to all as to render any mention herein superfluous. The sliding door or gate to each of the conducting-tubes is raised according to the height at which the clay stands in the tank, so as to allow a free passage of clay-water through it. The clay all having been thus passed through the apparatus and dressed or cleansed of all its impurities or gritty substances, the flow of water is stopped and the machine cleansed, the clay being drawn off from the tank by opening the clack-valve $a'$ in the bottom of the same through the connecting-rod $b'$, passing into the spout or conducting-gutter $c'$ into any receptacle for calcining or whatever operation may be necessary to still further prepare it for use.

In lieu of using both drags and receivers at once, only one may be employed, the common launders for the two being suitably closed therefor by shutting the gates $f'$ and $g$, in which case, when one receiver has been sufficiently filled to require its contents to be emptied the other can then be put in proper connection with the supplying-strake $b$, as is evident without further explanation.

Although I have particularly explained my improved apparatus in connection with the dressing of kaolin or clay especially adapted to the manufacture of porcelain and paper, it may be as well used for the dressing of various mineral, without departing from the principle of the present invention, and therefore I do not intend to limit myself to any one particular mineral for which it is to be used.

I claim as new and desire to secure by Letters Patent—

1. Passing the mineral to be dressed in connection with a current or currents of water or other suitable liquid through a drag or drags or their equivalents, having a series of one or more flood-gates arranged in such a manner as to be opened and closed at pleasure, by means of which gates the said passage of the water with the mineral can be regulated according as may be necessary, substantially as herein described.

2. Delivering the mineral, after having been dressed in any proper manner, to one or more suitable receivers or tanks at or near the bottom thereof, substantially as and for the purpose specified.

3. Removing the clay from the receivers of the cleansing or dressing apparatus through any suitable opening or openings in the bottom of the same, substantially as set forth.

The above specification of my invention signed by me this 3d day of July, 1865.

THOS. MOORE.

Witnesses:
SARAH F. KELLOGG,
CHARLOTTE E. PAYNE.